United States Patent [19]

Taniguchi

[11] Patent Number: 5,067,369
[45] Date of Patent: Nov. 26, 1991

[54] CERAMIC CAMSHAFT

[75] Inventor: Masato Taniguchi, Nagoya, Japan

[73] Assignee: NGK Spark Plug, Nagoya, Japan

[21] Appl. No.: 538,310

[22] Filed: Apr. 12, 1990

[30] Foreign Application Priority Data

Apr. 12, 1989 [JP] Japan ................. 1-42577[U]

[51] Int. Cl.$^5$ ..................... F16H 53/00; F01L 1/04
[52] U.S. Cl. ............................. 74/567; 123/90.60
[58] Field of Search ............... 74/567, 572; 123/90.60,
123/90.39, 90.49, 48 R, 48 AA; 51/165.71, 281
C; 148/127, 321; 228/903; 164/6, 9; 29/447,
525

[56] References Cited

U.S. PATENT DOCUMENTS

| | | | |
|---|---|---|---|
| 4,643,144 | 2/1987 | Fingerle et al. ............... | 123/90.60 |
| 4,659,245 | 4/1987 | Hirao et al. .................. | 74/572 |
| 4,697,325 | 10/1987 | Kamigaito et al. ........... | 29/447 |
| 4,768,476 | 9/1988 | Behnke et al. ................ | 29/447 |
| 4,829,951 | 5/1989 | Hafele .......................... | 123/90.60 |
| 4,848,286 | 7/1989 | Bentz ........................... | 123/90.51 |
| 4,890,783 | 1/1990 | Li ................................. | 148/127 X |
| 4,902,358 | 2/1990 | Napier et al. ................. | 148/321 X |
| 4,906,306 | 3/1990 | Araki et al. .................. | 148/127 X |

FOREIGN PATENT DOCUMENTS 1202771  9/1986  Japan ................. 74/567

Primary Examiner—Vinh T. Luong
Attorney, Agent, or Firm—Sughrue, Mion Zinn Macpeak & Seas

[57] ABSTRACT

A camshaft structure has shaft portions made of metal and which are axially aligned with each other. Ceramic cam portions are axially sandwiched between adjacent shaft portions. A thin layer of brazing alloy is arranged between adjacent surfaces of the shaft portions and cam portions so as to integrally bond the portions together to provide a high ridigity structure.

3 Claims, 2 Drawing Sheets

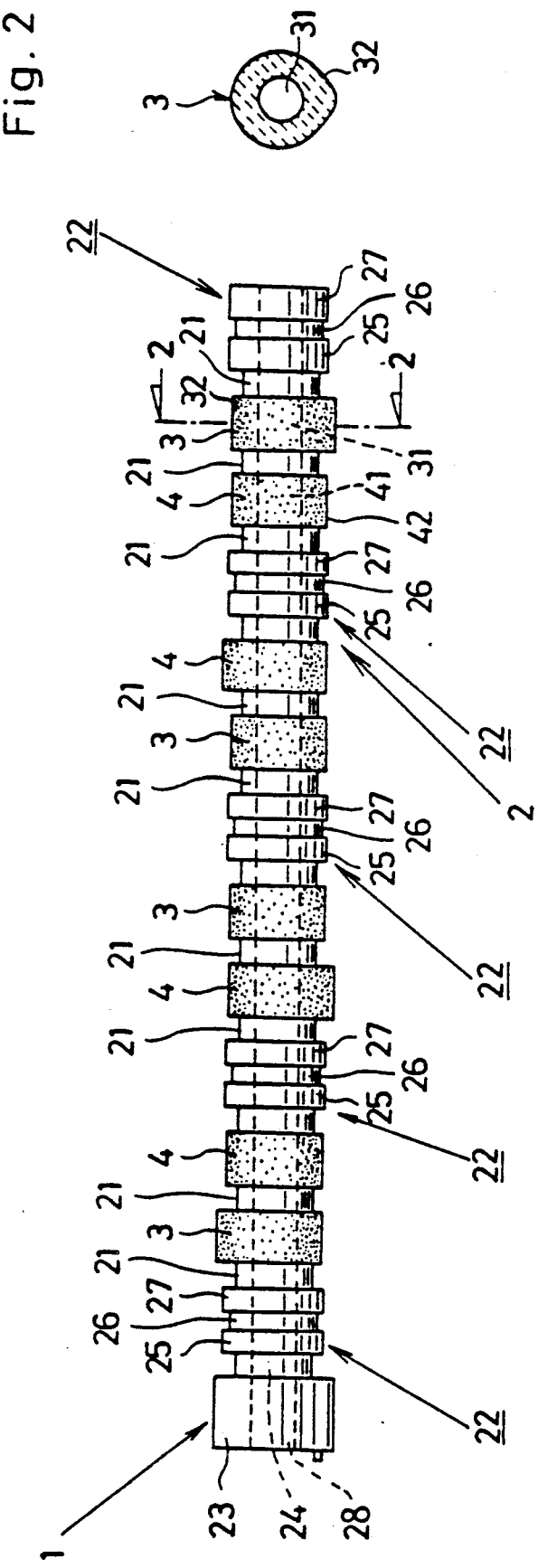

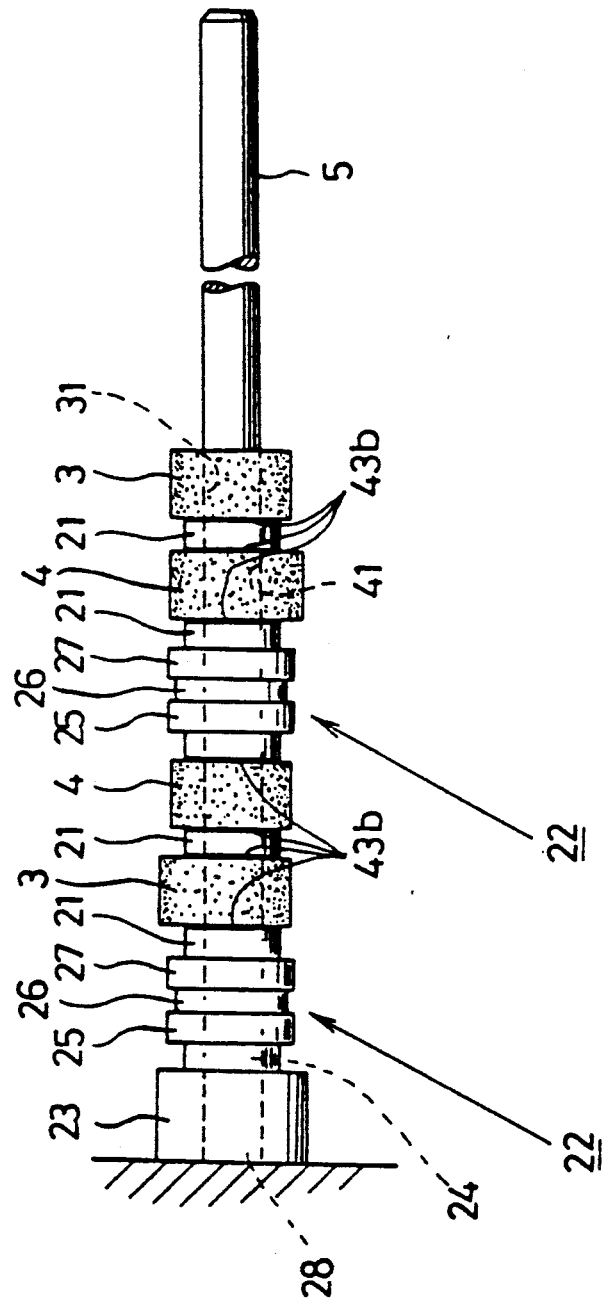

CERAMIC CAMSHAFT

BACKGROUND OF THE INVENTION

1. Field of the Invention

This invention relates to camshaft structure which translates rotary movement into reciprocal movement, and particularly concerns a cam-shaft having ceramic cam portions which have an attrition-resistant property when applied to a valve system in an internal combustion engine.

2. Description of Prior Art

In a camshaft as shown in Japanese Utility Model Provisional Publication No. 61-8171 published March 13, 1986, a ceramic cam is inserted into a metallic shaft body to improve an attrition-resistant property of the cam, and at the same time, increasing light weight property.

In this instance, a pin and a metallic sleeve are used as an axial positioning means, while a key and groove are employed to protect the cam against a rotary slip. The groove is provided in the outer surface of the metallic shaft body, and inner surface of the ceramic cam, the key is placed in both the grooves, Further, the outer surface of the shaft body and the inner surface of the cam are bonded by means of brazing.

The rotary movement of the shaft body, however, is transmitted by means of the key and grooves, so that transmission power may be locally applied at the key and grooves to establish stress concentration.

Further, it is necessary to provide the sleeve and the pin in addition to the key so as to produce a complicated structure, thus making assembling time-consuming and troublesome.

Therefore, it is an object of this invention to provide a camshaft with ceramic cam portions which is capable of obviating the stress concentration and facilitating the assembling thus leading to an improvement of production.

SUMMARY OF THE INvENTION

The present invention provides a new and improved camshaft structure comprising:

a plurality of shaft portions which are made of metal and axially aligned with each other, a plurality of cam portions which are made of ceramic material and axially aligned and alternating with the shaft portions, and a thin layer of a thermal bonding agent disposed between adjacent surfaces of the shaft and cam portions so as to integrally bond said shaft and cam portions together.

The cam portions and the shaft portions are aligned at their adjacent end surfaces, so that the adjacent end surfaces are integrally bonded by means of brazing with high strength.

Such a structure provides increased resistance against radial and rotary displacement between the shaft portions and the cam portions thereby eliminating the necessity of the key and groove, while obviating stress concentration to contribute to a long service life.

With the elimination of the prior pin and the sleeve, the number of assembled components is reduced to provide a reduced cost simple structure, thus also facilitating the assembly and leading to an improvement of production.

These and other objects, features and advantages of the invention will be more realized and understood from the following detailed description when taken in conjunction with the accompanying drawings.

BRIEF DESCRIPTION OF THE DRAWINGS

FIG. 1 is a side elevational view of a camshaft according to the invention;

FIG. 2 is a cross sectional view along the line 2—2 of FIG. 1;

FIG. 3 is a side elevational view of a camshaft during assemble process according to the invention.

DETAILED DESCRIPTION OF THE PREFERRED EMBODIMENT

FIGS. 1, and 2 show a ceramic camshaft 1 adapted to be incorporated into a rocker-arm overhead type four cylinder internal combustion engine with a displacement of 1800 cc.

The ceramic camshaft 1 has a camshaft portion 2 which is driven by a crankshaft (not shown) of the engine, and at the same time, having other cam portions 3, 4 which in turn drive an intake valve and an exhaust valve of the engine cylinder. The camshaft portion 2 comprises a plurality of axially aligned shaft portions 21 and a coupling shaft portion 23 which are made of metallic steel forged from JIS SNCM439, JIS SNCM616, JIS SNCM630 or JIS SNCM815. In the foregoing designations JIS and SNCM stand for Japanese Industrial Standard and Steel of Nickel Chromium Molybdenum, respectively. The first number in each designation stands for the quantity of the main element of the alloy and the last two numbers stand for the quantity of carbon.

The shaft portions 21 are all in the form of a hollow cylinder, and axially aligned between the cam portions 3, 4, and axially placed between the cam portion 3 and the coupling shaft portion 23. Some of the shaft portions 21 have a pulley-shaped journal portion 22 comprised of ring portions 25, 27 and a groove 26 between the portions 25, 27. An inner hollow space of the shaft portion 21 serves as a hole 24, the center of which is in accordance with that of rotation.

The coupling shaft portion 23 is in the form of a hollow cylinder and is connected to a sprocket (not shown) which is driven by the crankshaft. An inner hollow of the coupling shaft portion 23 services as a hole 28 which has an inner diameter identical to that of the hole 24. The cam portions 3, 4 are shaped in accordance with a predetermined cam profile, and axially placed between the shaft portions 21.

The cam portions 3, 4 are made of attrition-resistant ceramic material such as silicon nitride, sialon, silicon carbide, aluminum nitride or alumina. Each of the cam portions 3, 4 has a hole 31 (41) at its inner hollow space, the center of which is in accordance with that of rotaiton.

In this instance, the cam portions 3, 4 in turn have cam faces 32, 42 which are adapted to be brought into engagement with a rocker arm (not shown) of a valve system.

The coupling shaft portion 23, the shaft portions 21 and the cam portions 3, 4 are axially aligned in series each other, and each of the opposing end surfaces are integrally bonded by a thermal bonding agent such as, for example, brazing alloy 43b. Materials for the brazing alloy are appropriately selected among a brass alloy, argentum alloy, manganese alloy, iron alloy and nickel silver alloy.

Assembly of the camshaft structure thus described is as follows:

A metallic steel such as e.g. JIS SNCM630 is forged to form a plurality of the shaft portions 21 which have an outer diameter of 25 mm and an inner diameter of 15 mm. The journal portion 22 of the shaft portions 211 has an outer diameter of 33 mm at the ring portions 25, 27.

Then, a metallic steel such as e.g. JIS SNCM630 is forged to form the coupling shaft portion 23 which has an outer diameter of 40 MM and an inner diameter of 15 mm. The steel of JIS SNCM630 consist of C; 0.25–0.35, Si; 0.15–0.35, Mn; 0.35–0.60, Ni; 2.50–3.50, Cr; 2.50–3.50, Mo; 0.50–0.70 (by weight percent).

A binder (90 weight percent) such as an aluminum nitride or alumina is added to silicon nitride (10 weight percent), and conditioned to be compressed by a metallic die (not shown). The compact piece thus compressed is sintered under the normal pressure, and formed into the elliptical cam portions 3, 4, each of which is measured 38.5 mm in major diameter, 32.5 mm in minor diameter, and 18 mm in thickness.

Further, each diameter of the holes 31, 41 is measured 15 mm.

The cam portions 3, 4, shaft portions 21 and the coupling shaft portion 23 are placed on a carbon support bar 5 which has an outer diameter of 15 mm identical to that of the holes 24, 28, 31, 41. At this time, a thin layer of the thermal bonding agent placed to serve as the brazing alloy 43b between the confronting end surfaces of neighboring cam portions 3, 4 and the coupling shaft portion 23.

The cam portions 3, 4 are temporarily held to maintain an angular interval of 90 degrees by means of a support (not shown).

In this instance, the thin layer of the brazing alloy 43bis a silver alloy consisting of Cu; 20.0–35.0%, In; 5.0–11.0%, Ti; 1.00–1.35%, Ag; the rest of all. The brazing alloy of this kind has solidus point of 625° C. at which the brazing alloy turns to solid state.

The cam portions 3, 4, shaft portions 21 and the coupling shaft portion 23 together with the carbon support bar 5, are placed within a vacuum atmosphere, and heated under the temperature of 795° C. for thirty minutes so as to melt down the brazing alloy, and then cooled for ten minutes until the temperature decreases to 300° C. As a result, the end surfaces of the cam portions 3 and 4 are integrally bonded to the adjacent ends of the shaft portions 21. It is noted that the Rockwell hardness of the journal portion 22 is preferably mor than HRC 35, considering that the journal portion 22 is supported by bearing. The steel of JIS SNCM630 has a martensite allotropic transformation even at lower cooling rate, and it is found that the hardness of the journal portion 22 is HRC 45 which is acceptable as a journal.

Then, the cam faces 32, 42 of the cam portions 3, 4 are polished, while the ring portions 25, 27 of the journal portion 22 are externally polished.

The carbon support bar 5 is removed to provide ceramic camshaft structure 1 which is in the form of hollow cylinder of light weight thereby resulting in weight reduction of the engine as a whole.

The endurance test is carried out with the ceramic camshaft mounted on the engine under the conditions o 6000 rpm for 200 hours. As a result, no faults are found in the cam portions 3, 4.

As understood from the foregoing description, the cam portions 3, 4, shaft portions 21 and the coupling shaft portion 23 are bonded at their opposing end surfaces, so that the opposing end surfaces are integrally bonded by means of brazing with high strength.

This enables an increased resistance against radial (shearing direction) and rotary displacement (tortional direction) between the shaft portions and the cam portions, and eliminating the necessity of the key and groove, while obviating stress concentration to contribute to a long service life.

With the elimination of the prior pin and the sleeve, the number of assembled components is reduced to provide low cost with simple structure, thus also facilitating the assembly and leading to an improvement of production.

The portions which have an attrition-resistant property are the cam portions 3, 4 which engage with the rocker arm.

Therefore, as mentioned above, only the cam portions 3, 4 are made of the attrition-resistant ceramics to make a lightweight product as a whole.

With the employment of the carbon support bar 5, the rotary centers of the cam portions 3, 4, the shaft portions 21 and the coupling shaft portion 23 are automatically aligned to facilitate the assembly with simple procedures.

The difference of thermal contraction between cam portions 3, 4 and the shaft portions 21, can be reduced by selecting their compositions. High rigidity is obtained with the camshaft 1 compared to the counterpart case in which soft copper cushion plates are placed among cam portions and shaft portions.

It is appreciated that the shaft portions may be in the form of solid cylindrical shapes instead of the hollow cylinders. The cross section of the shaft portion may be noncircular such as elliptical and polygonal.

The camshaft according to the invention, is applied to a direct overhead cam type valve system, an overhead type valve system and a side valve system each of which may be incorporated into an internal combustion engine.

Further, the camshaft according to the invention may be incorporated into a mechanical-electrical system in which a rotary movement is translated into a reciprocal movement.

As various changes could be made in the above constructions without departing from the scope of the invention, it is intended that all matter contained in the above-description or shown in the accompanying drawings shall be interpreted as illustrative and not in a limiting sense.

I claim:

1. A camshaft structure comprising:
   a plurality of axially aligned shaft portions, each of which is made of metallic material; and
   cylindrical cam portions each made from a ceramic material, and alternately arranged between the shaft portions with end surfaces of the cam portions being integrally bonded to adjacent surfaces of the shaft portions by means of a thermal bonding agent which has been brazed.

2. A camshaft structure as recited in claim 1, wherein each of the cam portions is made from an attrition resistant material selected from the group consisting of silicon nitride, sialon, silicon carbide, aluminum nitride and alumina.

3. A camshaft structure as received in claim 1, wherien the thermal bonding agent is comprised of brazing alloys.

* * * * *